(12) United States Patent
Whitehill et al.

(10) Patent No.: US 8,325,653 B2
(45) Date of Patent: Dec. 4, 2012

(54) SYSTEM AND METHOD FOR RESTRICTING NETWORK ACCESS TO ONE OR MORE NODES IN A WIRELESS COMMUNICATIONS NETWORK

(75) Inventors: Eric A. Whitehill, Fort Wayne, IN (US); Eric D. White, Cedarburg, WI (US)

(73) Assignee: MeshNetworks, Inc., Maitland, FL (US)

( * ) Notice: Subject to any disclaimer, the term of this patent is extended or adjusted under 35 U.S.C. 154(b) by 699 days.

(21) Appl. No.: 11/343,550

(22) Filed: Jan. 31, 2006

(65) Prior Publication Data

US 2006/0153075 A1    Jul. 13, 2006

Related U.S. Application Data (63) Continuation of application No. 10/270,003, filed on Oct. 15, 2002, now Pat. No. 7,042,867.

(60) Provisional application No. 60/398,834, filed on Jul. 29, 2002.

(51) Int. Cl.
H04W 4/00    (2009.01)

(52) U.S. Cl. ...... 370/329; 370/338; 455/411; 455/456.2

(58) Field of Classification Search ............... 370/310.2, 370/329, 338; 455/411, 422.1, 435.1, 453, 455/456.2; 701/200, 209
See application file for complete search history.

(56) References Cited

U.S. PATENT DOCUMENTS

| 4,494,192 A | 1/1985 | Lew et al. |
| 4,617,656 A | 10/1986 | Kobayashi et al. |
| 4,736,371 A | 4/1988 | Tejima et al. |
| 4,742,357 A | 5/1988 | Rackley |
| 4,747,130 A | 5/1988 | Ho |
| 4,910,521 A | 3/1990 | Mellon |
| 5,034,961 A | 7/1991 | Adams |
| 5,068,916 A | 11/1991 | Harrison et al. |
| 5,231,634 A | 7/1993 | Giles et al. |
| 5,233,604 A | 8/1993 | Ahmadi et al. |

(Continued)

FOREIGN PATENT DOCUMENTS

CA    2132180    3/1996

(Continued)

OTHER PUBLICATIONS

Broch, Josh et al, A Performance Comparison of Multi-Hop Wireless Ad Hoc Network Routing Protocols, Proceedings of the 4th Annual ACM/IEEE International Conference on Mobile Computing and Networking, Oct. 25-30, 1998, 16 pages.

(Continued)

Primary Examiner — Jung Park
(74) Attorney, Agent, or Firm — Randi L. Karpinia (57) ABSTRACT

A system and method for providing security to a wireless network by using a mobile node's location as a parameter for deciding if access is to be given to the node. The system and method employ access points, wireless routers and mobile nodes, each including at least one transceiver adapted to transmit and receive communication signals to and from other wireless routers, mobile nodes and other mobile access points. Each access point is connected to a network management system which allows enhanced network monitoring and control. Each network node includes technology which may determine an absolute node location containing latitude, longitude and altitude of a node, or a relative node location containing the distance and angle between nodes, or a combination of both absolute and relative location data.

16 Claims, 7 Drawing Sheets

U.S. PATENT DOCUMENTS

| | | | |
|---|---|---|---|
| 5,241,542 A | 8/1993 | Natarajan et al. |
| 5,317,566 A | 5/1994 | Joshi |
| 5,392,450 A | 2/1995 | Nossen |
| 5,412,654 A | 5/1995 | Perkins |
| 5,424,747 A | 6/1995 | Chazelas |
| 5,502,446 A | 3/1996 | Denninger |
| 5,502,722 A | 3/1996 | Fulghum |
| 5,517,491 A | 5/1996 | Nanni et al. |
| 5,555,425 A | 9/1996 | Zeller et al. |
| 5,555,540 A | 9/1996 | Radke |
| 5,572,528 A | 11/1996 | Shuen |
| 5,615,212 A | 3/1997 | Ruszczyk et al. |
| 5,618,045 A | 4/1997 | Kagan et al. |
| 5,621,732 A | 4/1997 | Osawa |
| 5,623,495 A | 4/1997 | Eng et al. |
| 5,627,976 A | 5/1997 | McFarland et al. |
| 5,631,897 A | 5/1997 | Pacheco et al. |
| 5,644,576 A | 7/1997 | Bauchot et al. |
| 5,652,751 A | 7/1997 | Sharony |
| 5,680,392 A | 10/1997 | Semaan |
| 5,684,794 A | 11/1997 | Lopez et al. |
| 5,687,194 A | 11/1997 | Paneth et al. |
| 5,696,903 A | 12/1997 | Mahany |
| 5,701,294 A | 12/1997 | Ward et al. |
| 5,706,428 A | 1/1998 | Boer et al. |
| 5,717,689 A | 2/1998 | Ayanoglu |
| 5,745,483 A | 4/1998 | Nakagawa et al. |
| 5,774,876 A | 6/1998 | Wooley et al. |
| 5,781,540 A | 7/1998 | Malcolm et al. |
| 5,787,080 A | 7/1998 | Hulyalkar et al. |
| 5,794,154 A | 8/1998 | Bar-On et al. |
| 5,796,732 A | 8/1998 | Mazzola et al. |
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,835,857 A | 11/1998 | Otten |
| 5,844,905 A | 12/1998 | McKay et al. |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |
| 5,909,651 A | 6/1999 | Chander et al. |
| 5,936,953 A | 8/1999 | Simmons |
| 5,943,322 A | 8/1999 | Mayor et al. |
| 5,987,011 A | 11/1999 | Toh |
| 5,987,033 A | 11/1999 | Boer et al. |
| 5,991,279 A | 11/1999 | Haugli et al. |
| 6,028,853 A | 2/2000 | Haartsen |
| 6,029,217 A | 2/2000 | Arimilli et al. |
| 6,034,542 A | 3/2000 | Ridgeway |
| 6,034,950 A | 3/2000 | Sauer et al. |
| 6,044,062 A | 3/2000 | Brownrigg et al. |
| 6,047,330 A | 4/2000 | Stracke, Jr. |
| 6,052,594 A | 4/2000 | Chuang et al. |
| 6,052,752 A | 4/2000 | Kwon |
| 6,064,626 A | 5/2000 | Stevens |
| 6,067,291 A | 5/2000 | Kamerman et al. |
| 6,067,297 A | 5/2000 | Beach |
| 6,078,566 A | 6/2000 | Kikinis |
| 6,088,337 A | 7/2000 | Eastmond et al. |
| 6,104,712 A | 8/2000 | Robert et al. |
| 6,108,738 A | 8/2000 | Chambers et al. |
| 6,115,580 A | 9/2000 | Chuprun et al. |
| 6,122,690 A | 9/2000 | Nannetti et al. |
| 6,130,881 A | 10/2000 | Stiller et al. |
| 6,132,306 A | 10/2000 | Trompower |
| 6,154,172 A | 11/2000 | Piccionelli et al. |
| 6,163,699 A | 12/2000 | Naor et al. |
| 6,178,337 B1 | 1/2001 | Spartz et al. |
| 6,192,053 B1 | 2/2001 | Angelico et al. |
| 6,192,230 B1 | 2/2001 | Van Bokhorst et al. |
| 6,208,870 B1 | 3/2001 | Lorello et al. |
| 6,212,390 B1 | 4/2001 | Rune |
| 6,222,463 B1 | 4/2001 | Rai |
| 6,223,240 B1 | 4/2001 | Odenwald et al. |
| 6,240,294 B1 | 5/2001 | Hamilton et al. |
| 6,246,875 B1 | 6/2001 | Seaholtz et al. |
| 6,249,516 B1 | 6/2001 | Brownrigg et al. |
| 6,275,707 B1 | 8/2001 | Reed et al. |
| 6,285,892 B1 | 9/2001 | Hulyalkar |
| 6,304,556 B1 | 10/2001 | Haas |
| 6,327,300 B1 | 12/2001 | Souissi et al. |
| 6,349,091 B1 | 2/2002 | Li |
| 6,349,210 B1 | 2/2002 | Li |
| 6,359,872 B1 | 3/2002 | Mahaney et al. |
| 6,377,636 B1 | 4/2002 | Paulraj et al. |
| 6,404,756 B1 | 6/2002 | Whitehill et al. |
| 6,456,599 B1 | 9/2002 | Elliott |
| 6,505,049 B1 | 1/2003 | Dorenbosch |
| 6,519,464 B1 | 2/2003 | Santhoff et al. |
| 6,539,232 B2 | 3/2003 | Hendrey et al. |
| 6,574,266 B1 | 6/2003 | Haartsen |
| 6,618,690 B1 | 9/2003 | Syrjarinne |
| 6,625,135 B1 | 9/2003 | Johnson et al. |
| 6,697,649 B1 | 2/2004 | Bennett et al. |
| 6,728,545 B1 | 4/2004 | Belcea |
| 6,744,740 B2 | 6/2004 | Chen |
| 6,768,730 B1 | 7/2004 | Whitehill |
| 6,807,165 B2 | 10/2004 | Belcea |
| 6,826,385 B2 * | 11/2004 | Kujala ............... 455/13.1 |
| 7,072,650 B2 | 7/2006 | Stanforth |
| 7,171,216 B1 * | 1/2007 | Choksi ............... 455/456.1 |
| 2001/0053699 A1 | 12/2001 | McGrady et al. |
| 2002/0058504 A1 | 5/2002 | Stanforth |
| 2002/0131386 A1 | 9/2002 | Gwon |
| 2003/0012168 A1 | 1/2003 | Elson et al. |
| 2003/0035437 A1 | 2/2003 | Garahi et al. |
| 2003/0053424 A1 | 3/2003 | Krishnamurthy et al. |
| 2003/0073406 A1 | 4/2003 | Benjamin et al. |
| 2003/0078986 A1 * | 4/2003 | Ayres et al. ............ 709/217 |
| 2003/0091010 A1 | 5/2003 | Garahi et al. |
| 2003/0118015 A1 | 6/2003 | Gunnarsson et al. |
| 2003/0156558 A1 | 8/2003 | Cromer et al. |
| 2003/0177219 A1 | 9/2003 | Taib et al. |
| 2003/0232620 A1 | 12/2003 | Runkle et al. |
| 2003/0233580 A1 * | 12/2003 | Keeler et al. ............ 713/201 |
| 2003/0235175 A1 | 12/2003 | Naghian et al. |
| 2004/0203380 A1 * | 10/2004 | Hamdi et al. ............ 455/41.2 |
| 2005/0268330 A1 * | 12/2005 | Di Rienzo ............ 726/4 |
| 2010/0262364 A1 * | 10/2010 | Ikeda ............... 701/207 |

FOREIGN PATENT DOCUMENTS

| | | | |
|---|---|---|---|
| WO | 9837722 A1 | 8/1998 |
| WO | 9955102 A1 | 10/1999 |
| WO | 0034932 | 6/2000 |
| WO | 0062574 A2 | 10/2000 |
| WO | 0110154 | 2/2001 |
| WO | 0127649 A1 | 4/2001 |
| WO | 0133770 | 5/2001 |
| WO | 0135567 | 5/2001 |
| WO | 0137481 | 5/2001 |
| WO | 0137482 | 5/2001 |
| WO | 0137483 | 5/2001 |
| WO | 0141036 A1 | 6/2001 |
| WO | 0141468 A2 | 6/2001 |
| WO | 0239710 A1 | 5/2002 |
| WO | 0249379 A1 | 6/2002 |
| WO | 2004002113 A1 | 12/2003 |

OTHER PUBLICATIONS

Elliott, Chip et al, Self-Organizing, Self-Healing Wireless Networks, Aerospace Conference Proceedings, Mar. 18-25, 2000, vol. 1, IEEE, 2000, pp. 149-156.

Garcia-Luna-Aceves, J.J. et al, Reversing the Collision-Avoidance Handshake in Wireless Networks, Mobicom, Seattle, Washington, 1999, 12 pages.

Garcia-Luna-Aceves, J.J. et al, Transmission-Efficient Routing in Wireless Networks Using Link-State Information, Mobile Networks and Applications, vol. 6, No. 3, Jun. 2001, pp. 223-238.

Garcia-Luna-Aceves, J.J. et al. The Core-Assisted Mesh Protocol, IEEE Normal on Selected Areas in Communications, vol. 17, No. 8, Aug. 1999, 18 pages.

Kamerman, AD et al, Net Throughput with IEEE 802.11 Wireless LANs. Wireless Communications and Networking Conference (WCNC), Sep. 23-28, 2000, Chicago, Illinois, vol. 2. IEEE, 2000, pp. 747-752.

McChesney, J.R. et al, Optimization of an Adaptive Link Control Protocol for Multimedia Packet Radio Networks, Military Communications Conference Proceedings (MILCOM), Oct. 31-Nov. 3, 1999, Atlantic City, NJ, IEEE, 1999, vol. 1, pp. 261-265.

North, Richard et al, Wireless Networked Radios: Comparison of Military, Commercial, and R&D Protocols, 2nd Annual UCSD Conference on Wireless Communications, San Diego, Feb. 28-Mar. 3, 1999, 8 pages.

Ramanathan, Ram et al, Topology Control of Multihop Wireless Networks Using Transmit Power Adjustment, INFOCOM Mar. 26-30, 2000, IEEE vol. 2, pp. 404-413.

Ramanathan, Ram et al, Hierarchically-Organized, Multihop Mobile Wireless Networks for Quality of Service Support, Mobile Networks and Applications, vol. 3, Issue 1, Jun. 1998, pp. 101-119.

Valko, Andras G., Cellular IP: A New Approach to Internet Host Mobility, ACM Computer Communication Review, Jul. 2000, 16 pages.

Peterson, Benjamin B. et al, Spread Spectrum Indoor Geolocation, Navigation: Journal of the Institute of Navigation, vol. 45, No. 2, summer 1998, Aug. 1998, 8 pages.

Wong et al, A Pattern Recognition System for Handoff Algorithms, IEEE Journal on Selected Areas in Communications, vol. 18, No. 7, Jul. 2000, 14 pages.

Young, C. David, USAP: A Unifying Dynamic Distributed Multichannel TDMA Slot Assignment Protocol, MILCOM, Oct. 21-24, 1996, IEEE vol. 1, 1996, pp. 235-239.

Zhenyu Tang et al, Collision-Avoidance Transmission Scheduling for Ad-Hoc Networks, IEEE International Conference on Communications (ICC), Jun. 18-22, 2000, IEEE vol. 3, 2000, pp. 1788-1794.

Wong et al, Soft handoffs in CDMA Mobile Systems. IEEE Personal Communications, Dec. 1997, 14 pages.

EPC, Supplementary Search Report, Jul. 19, 2008, EPC Application No. EP 03751814.9-2412, 4 pages.

EPC, Office Action, Rejection, Oct. 30, 2008, EPC Application No. EP 03751814.9-2412, 5 pages.

Japanese Patent Office, Office Action, Rejection (translated), mailed Aug. 5, 2008, Japanese Application No. 2004-524848, 4 pages.

USPTO, Office Action, Non-Final Rejection, Dec. 31, 2003, Application No. 10270003, 17 pages.

USPTO, Office Action, Non-Final Rejection, Aug. 25, 2004, Application No. 10270003, 12 pages.

USPTO, Office Action. Non-Final Rejection, Aug. 15, 2005, Application No. 10270003, 11 pages.

Ashby, N. et al, Introduction to Relativistic Effects on the Global Positioning System (1995), Global Positioning System: Theory and Applications, vol. I, American Institute of Aeronautics and Astronautics, 1996, ch. 18, pp. 923-697.

Axelrad, P. et al, GPS Navigation Algorithms (1994), Global Positioning System: Theory and Applications, vol. I, American Institute of Aeronautics and Astronautics, 1996, ch. 9, pp. 409-433.

Parkinson, Bradford W., GPS Error Analysis (1994), Global Positioning. System: Theory and Applications, vol. I, American Institute of Aeronautics and Astronautics, 1996, ch. 11, pp. 469-484.

Spilker, J.J. Jr., Satellite Constellation and Geometric Dilution of Precision (1994), Global Positioning System Theory and Applications, vol. I, American Institute of Aeronautics and Astronautics, 1996, ch. 5, pp. 177-208.

EPC Office Action to corresponding European Application No. 3751814.9 dated Jul. 30, 2010—4 pages.

KIPO Preliminary Report (Translation) to corresponding Korean Application No. 10-2004-7020883 dated Jun. 27, 2010—1 page.

Canadian Office Action to corresponding Canadian Application No. 2490260 (based on parent US Application) dated Sep. 15, 2011—2 pages.

Denning et al: Location-Based Authentication: Grounding Cyberspace for Better Security—dated Feb. 1996 , p. 12-16, XP002117683 ISSN: 1361-3723.

* cited by examiner

SYSTEM AND METHOD FOR RESTRICTING NETWORK ACCESS TO ONE OR MORE NODES IN A WIRELESS COMMUNICATIONS NETWORK

This application is a continuation of prior application Ser. No. 10/270,003, filed Oct. 15, 2002, now U.S. Pat. No. 7,042,867, which claims benefit under 35 U.S.C. §119(e) from U.S. provisional patent application Ser. No. 60/398,834 entitled "A System And Method For Determining Physical Location Of A Node In A Wireless Network During An Authentication Check Of The Node", filed Jul. 29, 2002, the entire contents of each are incorporated herein by reference.

BACKGROUND OF THE INVENTION

1. Field of the Invention

The present invention relates to a system and method for providing security for a wireless network, such as an ad-hoc wireless communications network, based on the position information relating to mobile nodes. More particularly, the present invention relates to a system and method for trusted infrastructure devices to compute the location of a mobile node in a wireless communications network, such as an ad-hoc terrestrial wireless communications network, during the authentication process.

2. Description of the Related Art

Wireless communications networks, such as mobile wireless telephone networks, have become increasingly prevalent over the past decade. These wireless communications networks are commonly referred to as "cellular networks" because the network infrastructure is arranged to divide the service area into a plurality of regions called "cells".

Specifically, a terrestrial cellular network includes a plurality of interconnected base stations that are distributed geographically at designated locations throughout the service area. Each base station includes one or more transceivers that are capable of transmitting and receiving electromagnetic signals, such as radio frequency (RF) communications signals, to and from user nodes, such as wireless telephones, located within the base station coverage area. The communications signals include, for example, voice data that has been modulated according to a desired modulation technique and transmitted as data packets. As can be appreciated by one skilled in the art, the transceiver and user nodes transmit and receive such data packets in multiplexed format, such as time-division multiple access (TDMA) format, code-division multiple access (CDMA) format, or frequency-division multiple access (FDMA) format, which enables a single transceiver at the base station to communicate simultaneously with several user nodes in it's coverage area.

In recent years, a type of mobile communications network known as an "ad-hoc" network has been developed for use by the military. In this type of network, each user node is capable of operating as a base station or router for the other user nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling user nodes to communicate with each other as in a conventional ad-hoc network, further enable the user nodes to access a fixed network and thus communicate with other user nodes, such as those on the public switched telephone network (PSTN), and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165, the entire content of each being incorporated herein by reference.

In either conventional wireless communications networks, or in ad-hoc wireless communications networks, it may be necessary or desirable to know or determine the geographic location of user nodes. Different types of location determining services and techniques for wireless communications networks are described in a publication by Nokia which can be found on the Nokia website at "www.nokia.com/press/background/pdf/mlbs.pdf", the entire content of which being incorporated herein by reference. In particular, the Nokia document states that location identification services are currently provided in wireless communications networks based on three major technologies. One of these technologies uses cell identification combined with Round Trip Time (RTT), Timing Advance (TA) and Measured Signal level (RX level), Time Difference of Arrival (TDOA) and Angle Of Arrival (AOA) techniques, the details of which can be appreciated by one skilled in the art. A second technology uses cellular signal timing based methods for code division multiple access (CDMA) and wideband code division multiple access (WCDMA). The third technology described in the Nokia document employs Global Positioning System (GPS) techniques.

Another list of methods and techniques currently used in the wireless communications industry for providing location services can be found at "www.911dispatch.com/911_file/location_tech.html", the entire content of which being incorporated herein by reference. Although the GPS technique is the last technique mentioned in this list, it is generally viewed as being more accurate than all of the other methods. Further details and descriptions of GPS based methods are set forth in a publication by J. J. Spilker Jr. entitled "Satellite Constellation and Geometric Dilution of Precision", in a publication by P. Axelrad et al. entitled "GPS Navigation Algorithms", in a publication by Bradford W. Parkinson entitled "GPS Error Analysis", and in a publication by N. Ashby et al. Entitled "Introduction to Relativistic Effects on the Global Positioning System", each found in "GPS—Theory and Applications", American Institute of Astronautics, 1996, the entire content of each being incorporated herein by reference.

Despite the fact that the GPS technique has been in use for a considerable period of time and most of the world's navigation relies on this technique, the GPS technique is very susceptible to errors in measurement. Therefore, the GPS technique is capable of providing location determination results with very high accuracy only after performing a relatively large number of measurements to remove such errors. A description of the shortcomings of GPS is set forth in a document by IMA entitled "Mathematical Challenges in Global Positioning Systems (GPS)" which can be found at "www.ima.umn.edu/gps", the entire content of this document being incorporated herein by reference. Certain other tests also demonstrate that the GPS technique is unsuitable for terrestrial-based networks.

In addition, other methods and techniques which do not use GPS satellites for determining mobile station locations in a wireless communications network typically require that the signal from the mobile station be received by at least two cell sites that can measure and process the delay between signal arrivals, identify the direction of the signal based on "path signature", and determine the distance between mobile station and the cell towers. In all of these methods, information processing is executed in a designated central processing unit (CPU) which is typically located at a cell tower next to the base station (BTS). Also, most of these methods were designed to comply with E911 requirements without requiring that excessive modifications be made to existing wireless communications systems. Examples of other location determining techniques are set forth in a document by CERN—European Organization for Nuclear Research, which can be found at "rkb.home.cern.ch/rkb/ANI16 pp/node98.html#SECTION 00098000000000000000", in a document by Wendy J Woodbury Straight entitled "Exploring a New Reference System", which can be found at "menstorsoftwareince.com/profile/newref.html", and in a document entitled "An Introduction to SnapTrac Server-Aided GPS Technology", which can be found at "www.snaptrack.com/pdf/ion.pdf", the entire content of each being incorporated herein by reference. Additional details may also be found in U.S. patent application Ser. No. 09/988,001 entitled "A System and Method for Computing the Location of a Mobile Terminal in a Wireless Communications Network", filed on Nov. 16, 2001, now U.S. Pat. No. 6,728,545, which describes a system and method for determining location with the use of technologies such as GPS, the entire content being incorporated herein by reference.

Accordingly, a need exists for a system and method for determining the location of a mobile user node in a wireless communications network by trusted infrastructure devices to determine if the device is physically within a predetermined "safe zone", and provide access to the network based on this location determination.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Wireless nodes wishing to obtain access to an enterprise LAN are typically required to authenticate themselves via the IP standard. Although this verifies that the user has the required challenge information, it does not prevent a computer that has been compromised from accessing the network. Due to the wireless interface, a user doesn't have to be inside the building in order to obtain access. Thus, a compromised computer with a wireless interface could be outside a business' secured environment, such as sitting in a parking lot, and obtain full access to the network services within a business building. Unlike a wired network, the wireless user doesn't need to pass the physical security checks such as a guard desk to obtain building access prior to plugging into the LAN.

In an embodiment of the present invention, or any other wireless technology which could be extended to add a location measurement (e.g. 802.11), the authentication server can request the wireless routers or access points to take time of flight measurements and report either the time of flight or the calculated distance. The authentication server can then determine if the location of the wireless user is within a defined space, such as a building outline, and the authentication server may reject users that are outside the perimeter.

Figure 1:
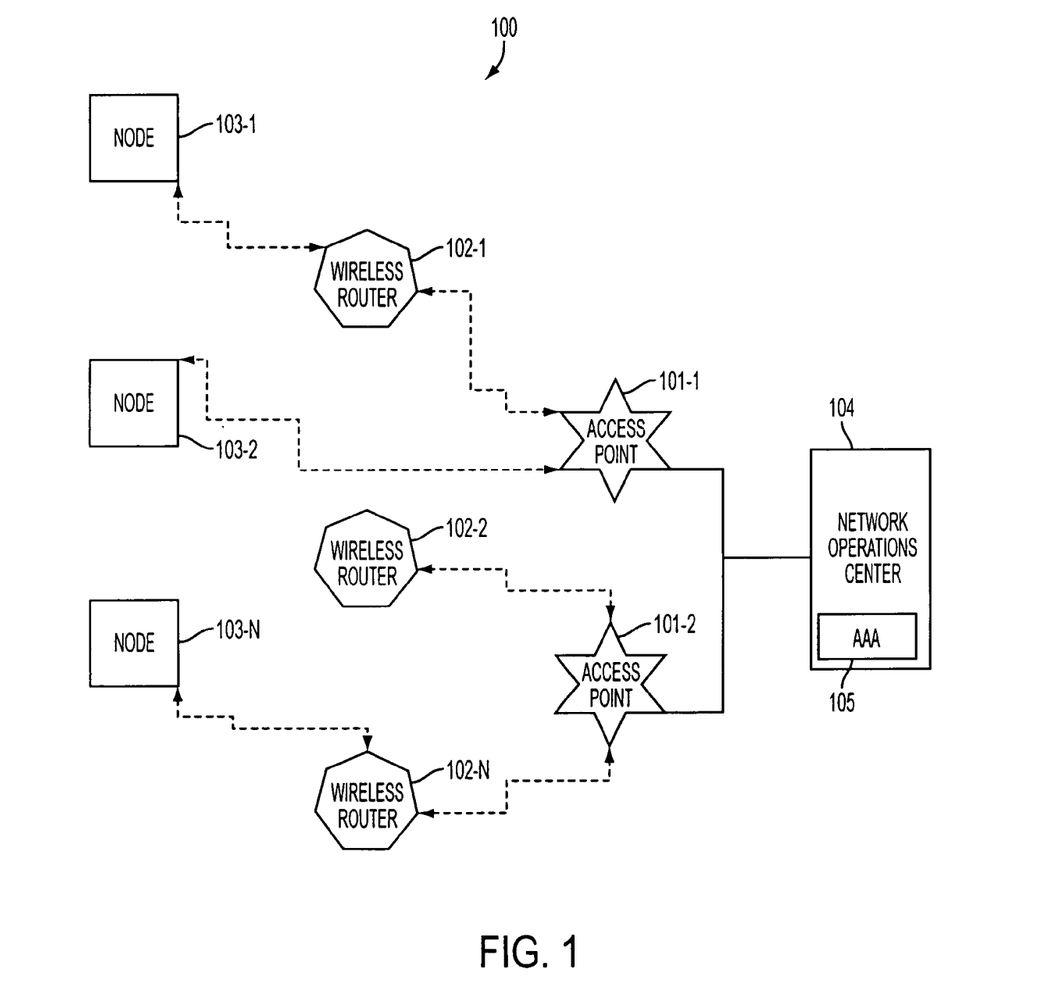
FIG. 1 is a block diagram of an example of an ad-hoc packet switched wireless communications network including a plurality of nodes employing an embodiment of the present invention.

FIG. 1 is a block diagram illustrating an example of a wireless communications network 100 employing mobile access nodes, or terminals, according to an embodiment of the present invention. As shown in FIG. 1, network 100 includes a plurality of devices, including access points (101-1 to 101-2), wireless routers (102-1 to 102-$n$) and mobile nodes (103-1 to 103-$n$) on the wireless side of the network, and a Network Operations Center 104 on the wired part of the network. Further details of the network 100 and its operation will now be described. For purposes of this discussion, the terms "user terminal" and "mobile node" will be used interchangeably.

Figure 2:
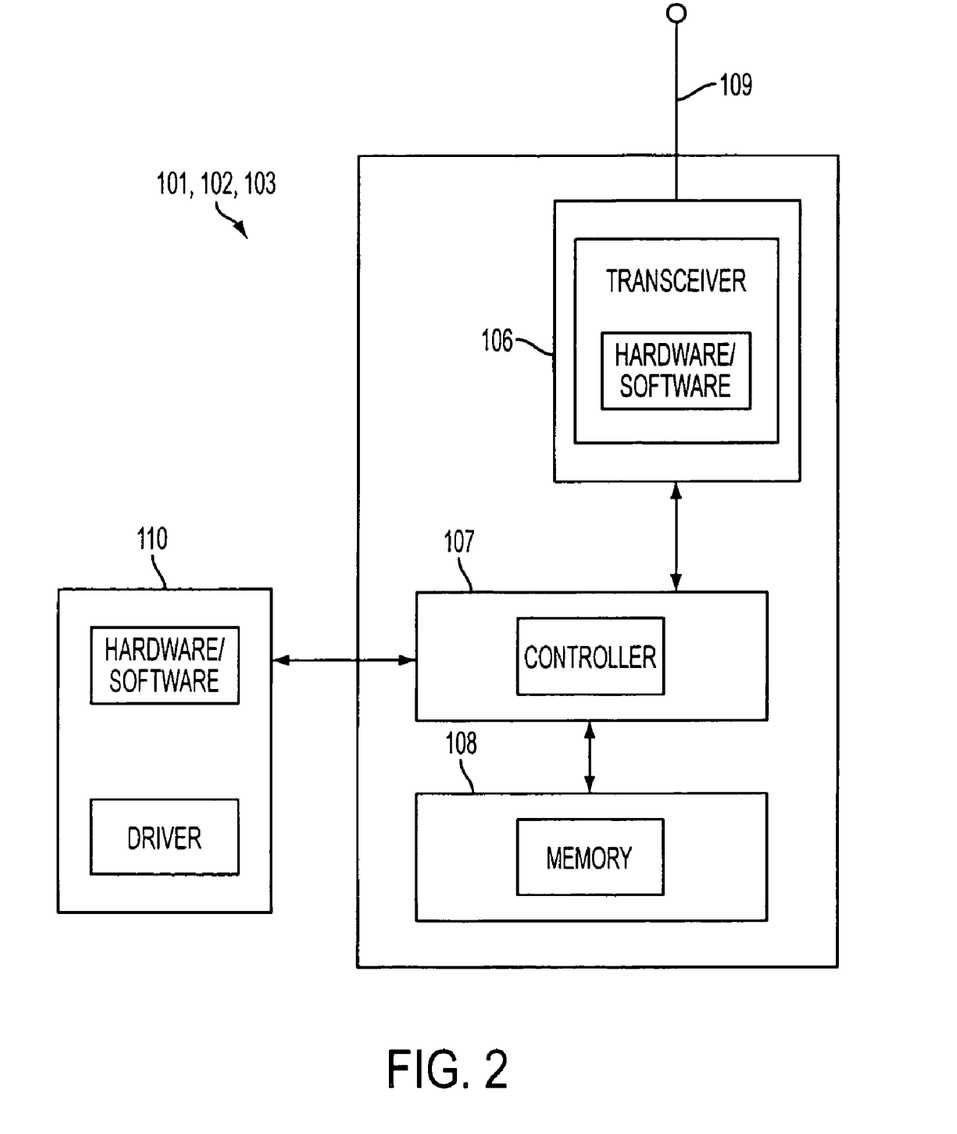
FIG. 2 is a block diagram illustrating an example of a node employed in the network shown in FIG. 1.

As shown in FIG. 2, each access point 101, wireless routers 102 and mobile node 103 includes at least one transceiver 106 and at least one controller 107. Each transceiver 106 is coupled to an antenna 109 and can transmit and receive data packets over any frequency band, for example, over the 2nd Institutional Scientific Medical (ISM) band.

The frequency and modulation scheme used by the transceiver 106 however, do not impact the implementation of the mobile access points 101, wireless routers 102, or nodes 103. Each node 101, 102 and 103 further includes a memory 108, such as a random access memory (RAM), that is capable of storing, among other things, routing information pertaining to itself and other nodes in the network 100. Certain nodes, in particular, mobile nodes 103-1 through 103-$n$, can be coupled to a host device 110, such as a personal computer (PC), personal data assistant (PDA), or any other suitable device for use by a user.

Each access point 101 and wireless router 102 maintains knowledge of their geographic location. This information may be manually entered, or the devices may include positioning functionality, such as global positioning system (GPS) functionality, differential navigation functionality, or other positioning functionality such as various triangulation techniques as can be appreciated by one skilled in the art, or as described in U.S. Pat. No. 6,728,545 referenced above, and in a U.S. Patent Application of Eric A. Whitehill, Ser. No. 09/973,799, for "A System And Method For Efficiently Performing Two-Way Ranging To Determine The Location Of A Wireless Node In A Communications Network", filed on Oct. 11, 2001, now U.S. Pat. No. 6,768,730, the entire contents of which being incorporated herein by reference.

Referring to FIG. 1, each node 101, 102 and 103 can be in communication with the Network Operations Center 104, either directly or via other nodes. The Network Communication Center typically consists of equipment used to configure and manage the wireless network, however, for the purposes of this description, only the Authentication, Authorization and Accounting (AAA) server 105 is shown.

Figure 3:
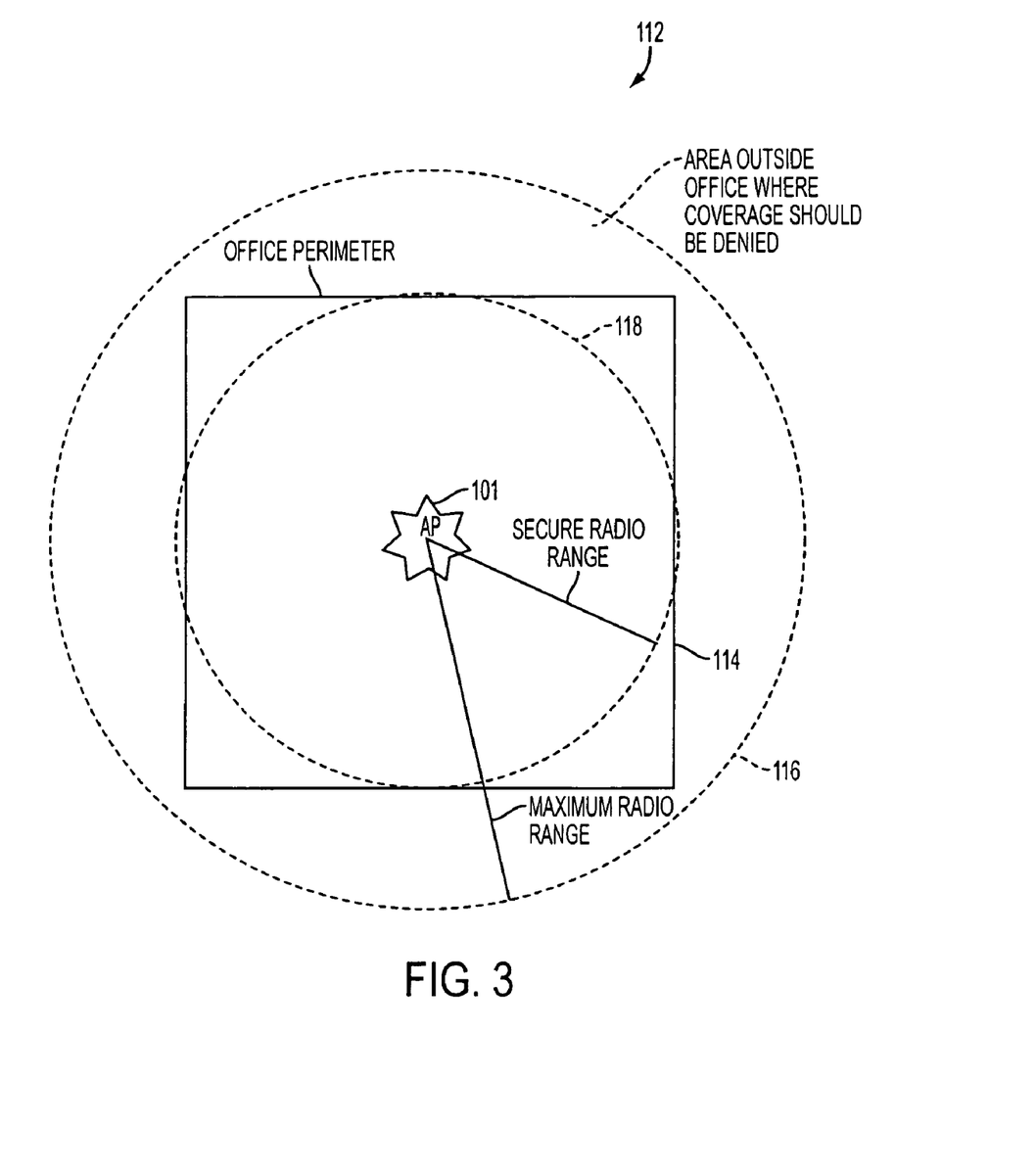
FIG. 3 is a diagram illustrating an example of the maximum and secure ranges of an infrastructure device in accordance with an embodiment of the present invention.

Coverage graph 112 of FIG. 3 shows an example of a network 100 deployment where a single access point 101 is used to provide wireless coverage to an area, such as an office, bounded by an office perimeter 114. In this example, the range of the transceiver 106 of the access point 101, shown bounded by 116, is greater than the perimeter 114 of the office. This could potentially allow an unauthorized user, located beyond the perimeter 114 but within the bounded area 116, to access the network 100. As part of the configuration of the network 100, however, the maximum radius of the transceiver range of access point 101 which guarantees that the user is physically in the secure space is determined. This range, shown bounded by 118, is subsequently used during the authorization process to determine if a node requesting access is within a network access restrict boundary.

Figure 4:
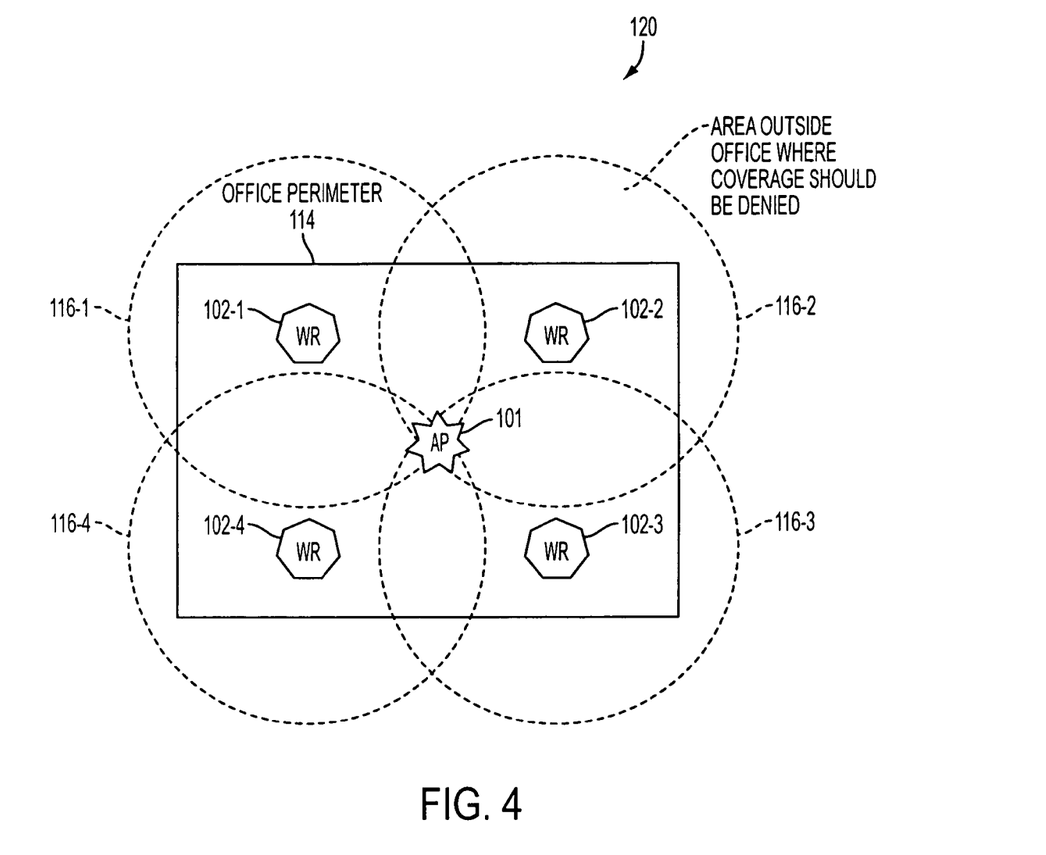
FIG. 4 is a diagram illustrating an example of a network layout with multiple infrastructure devices which have radio ranges which extend beyond the desired secure area in accordance with an embodiment of the present invention.
Figure 5:
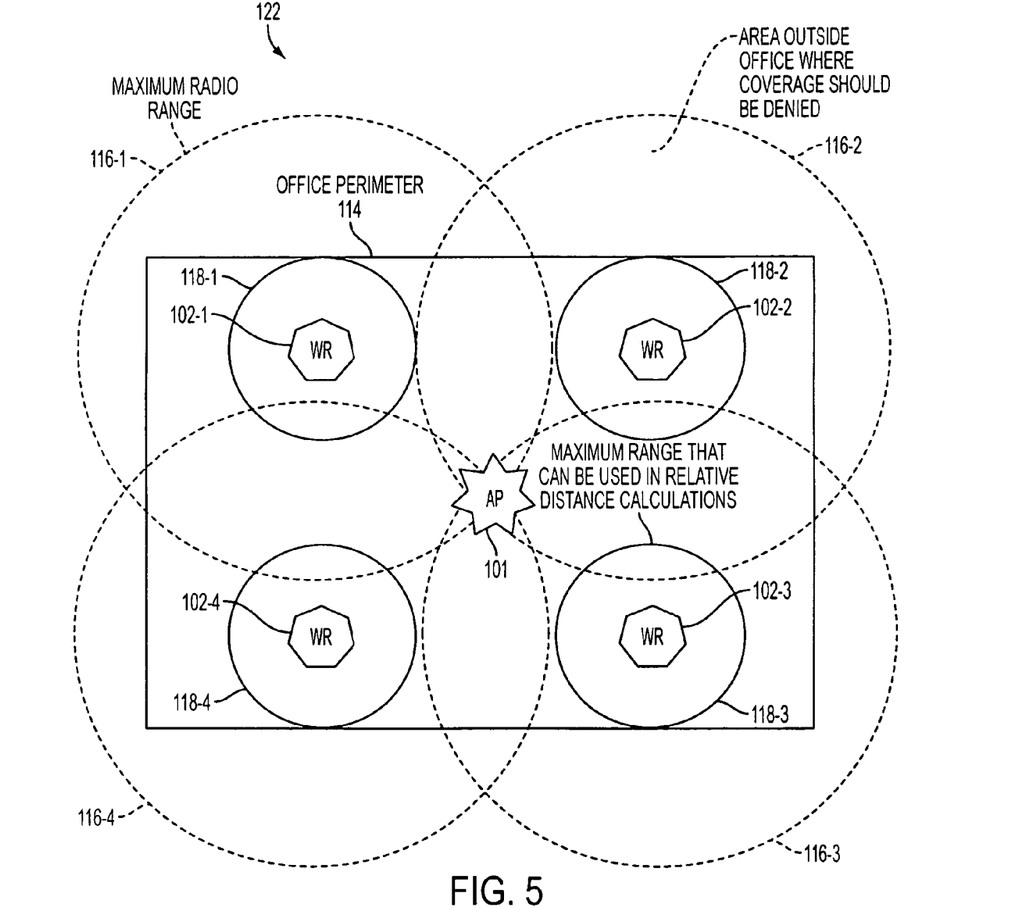
FIG. 5 is a diagram illustrating an example of the secure ranges for each wireless router in FIG. 4 in accordance with an embodiment of the present invention.

Coverage graph 120 of FIG. 4 shows an example of a larger network 100 configuration consisting of a single access point 101 and four wireless routers 102-1, 102-2, 102-3 and 102-4. In this example, the range of the transceiver 106 of each wireless router, shown bounded by 116-1, 116-2, 116-3 and 116-4 respectively, is greater than the perimeter 114 of the office, which could potentially allow an unauthorized user to access the network as described in FIG. 3. Therefore, as in FIG. 3, a maximum radius of each transceiver range which guarantees that the user is physically in the secure space is determined and subsequently used during the authorization process as shown in FIG. 5. As described in greater detail below, in each of FIGS. 3, 4 and 5, nodes requesting access to the network are first located by the fixed devices 101 and 102 within the network. Location of the requesting node is determined by measuring a distance at which the requesting node is located from a fixed device, including both wireless routers 102 and access point 101. If the requesting node is located within the secure space 118, access for the node is allowable on the basis of position.

Due to the placement of the devices in FIGS. 4 and 5 however, simply utilizing the distance of a mobile node to a wireless router may be insufficient for determining if the node is in the secure zone of any one wireless router, shown bounded by 118-1, 118-2, 118-3 and 118-4 respectively. As shown in coverage graph 124 of FIG. 6, mobile nodes 103-2 and 103-3 are both beyond the secure space of each fixed device, however, node 103-2 is located within the perimeter 114 and should be allowed access to the network on the basis of position. As described in greater detail below, the distance between each mobile node 103-1, 103-2 and 103-3 and multiple infrastructure devices must be determined to decide if the "absolute location" of a mobile node is within the perimeter 114, as shown in the coverage graph 124 of FIG. 6.

Figure 6:
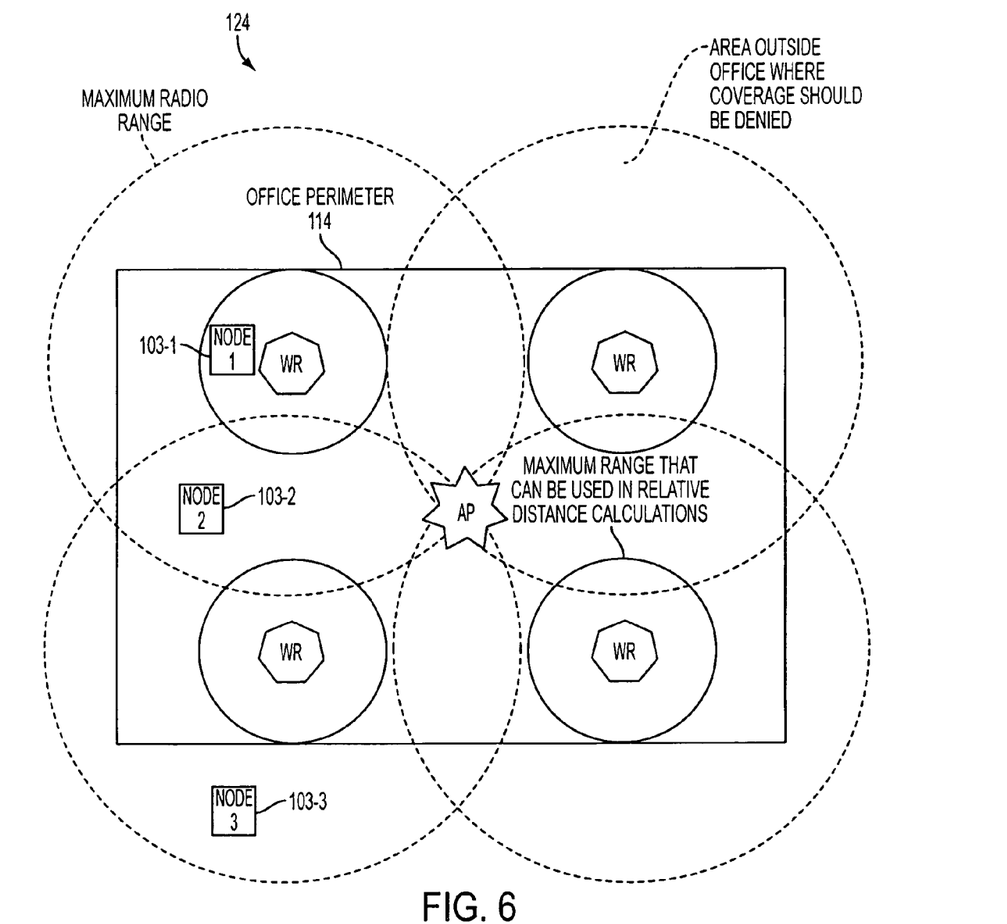
FIG. 6 is a diagram illustrating an example location of several mobile nodes which are within radio range of the wireless network in FIG. 4 in accordance with an embodiment of the present invention.
Figure 7:
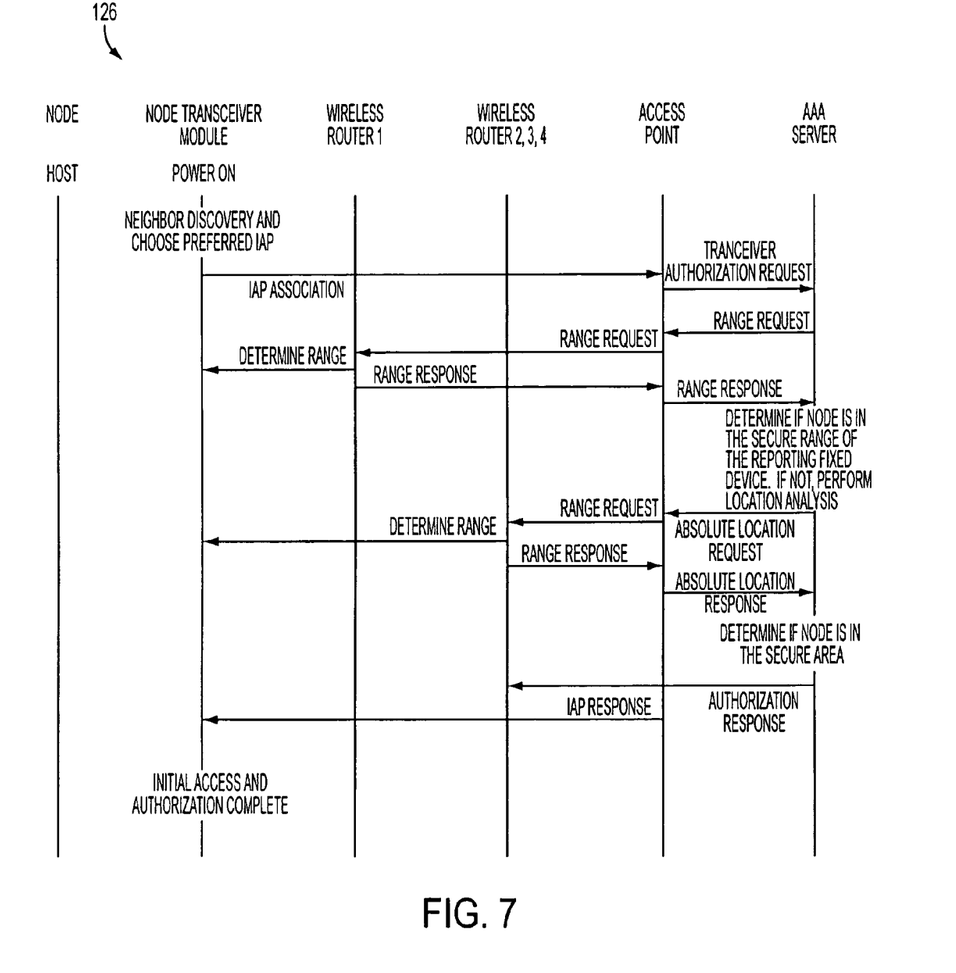
FIG. 7 is a ladder diagram illustrating an example of the flow of messages between devices during the authorization process in accordance with an embodiment of the present invention.

The ladder diagram 126 of FIG. 7 shows an example of the process flow that occurs for one embodiment of the present invention. Using the coverage graph 124 of FIG. 6 as an example, the process flow of FIG. 7 may be used to accurately locate mobile nodes requesting access and restrict network access based upon improper node location. Referring to FIGS. 6 and 7, the restricted access process of the embodiment of the present invention begins when a mobile node, such as node 103-2, powers up and the transceiver 106 of the node chooses a path to an access point 101, such as via the wireless router 102-1. The mobile node 103-2 sends a request to join the wireless network 100 and the wireless router 102-1 passes the message to the access point 101, which in turn passes the message to the Authentication, Authorization and Accounting (AAA) server 105.

As part of the authentication process, the AAA server 105 sends a message to the access point 101 requesting the range information of the mobile node 103-2, such as the location of the wireless router 102-1, and the distance between wireless router and the mobile device 103-2. The access point 101 receives the message from the AAA server and sends a request to the wireless router 102-1 to determine the distance between the mobile device 103-2 and the wireless router 102-1. The wireless router 102-1 executes a series of measurements, such as time of flight measurements, and determines the requested distance information, which is then sent to the AAA server 105 via the access point 101. The AAA server then calculates a position for the mobile node 103-2 and determines if the mobile node is within a secure zone 118-1, that is, within a zone in which network access by mobile nodes is allowed.

If the mobile node 103-2 is not found within the secure zone 118-1 by measurements provided by the wireless router 102-1, the AAA server 105 sends a request for an "absolute position" determination to the access point 101. The access point then requests neighboring wireless routers, such as 102-2, 102-3 and 102-4, to determine the distance between mobile node 103-2 and each wireless router 102-2, 102-3 and/or 102-4 respectively. In addition, the access point 101 may also determine the distance between the mobile node 103-2 and the access point 101. Each wireless router executes a series of measurements, such as time of flight measurements, and determines the requested distance information, which is then sent to the access point 101.

Upon receiving the additional distance information, the access point 101 calculates the absolute position of the mobile node 103-2 and sends the result to the AAA server 105. The AAA server 105 evaluates the absolute position of the mobile node 103-2 and determines if the mobile node is within the perimeter 114, and if so, sends a response to the original request for access from the wireless router 102-1 to allow the mobile node 103-2 to join the network on the basis of location.

There can be variations to the process flow in FIG. 7. For example, in another embodiment of the present invention, the AAA server 105 may request an absolute location without previously requesting the range information. The AAA server 105 may perform the calculations to determine if the mobile node 103 is in the secure zone, or it may send the information to an agent and subsequently use the agent's response. In each embodiment, the AAA server requests and receives location information and uses the location information received as part of the decision to provide service to the node.

In embodiments of the invention described above, security is maintained as the mobile nodes 103 cannot "spoof" the time of flight measurement used, since any attempt at processing the message would only delay the signal's return and effectively cause a greater distance to be calculated. Likewise, the mobile nodes 103 cannot provide an erroneous location since it they never queried for a self-determined location. All location determinations are done by infrastructure devices under control of the network.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A method for providing restricted network access to one or more nodes communicating within a wireless communication network, the method comprising:
   receiving, by an authentication server, a request for network access from a requesting node via an authenticated node;
   receiving, by the authentication server, a distance information between the requesting node and the authenticated node from the authenticated node;
   calculating, by the authentication server, a position of the requesting node using the received distance information; and
   allowing network access, by the authentication server, for the requesting node when the calculated position is within a network access boundary.

2. The method as claimed in claim 1, the method further comprising, prior to the authentication server receiving the distance information:
   executing, by the authenticated node, a series of measurements;
   determining, by the authenticated node, the distance information; and
   transmitting the distance information from the authenticated node to the authentication server.

3. The method as claimed in claim 2, further comprising, prior to the authenticated node executing the series of measurements:
   sending a request for the distance information from the authentication server to the authenticated node in response to receiving the request for network access.

4. The method as claimed in claim 2, wherein the series of measurements includes time of flight measurements.

5. The method as claimed in claim 2, wherein the distance information includes a location of the authenticated node, the method further comprising:
   determining, by the authenticated node, the location of the authenticated node.

6. The method of claim 5, wherein the location of the authenticated node is determined using one of a manual entry, a global position system functionality, a differential navigation functionality, and a triangulation technique.

7. The method as claimed in claim 1, wherein the distance information comprises a location of the authenticated node and a distance between the authenticated node and the requesting node.

8. The method as claimed in claim 1, wherein the authenticated node comprises one of an access point, a wireless router, and a mobile node.

9. The method as claimed in claim 1, wherein the authentication server comprises an authentication, authorization and accounting server.

10. The method as claimed in claim 1, wherein the authentication server is included within a network operations center.

11. The method as claimed in claim 1, wherein the requesting node comprises a mobile node.

12. The method as claimed in claim 1, wherein the network access boundary is independent of a transceiver range of the authenticated node.

13. The method as claimed in claim 1, further comprising prior to the authentication server receiving the request for network access:
   powering up the requesting node; and
   selecting a communication path including the authenticated node.

14. The method as claimed in claim 1, further comprising when the calculated position is not within a network access boundary:
   sending a request for an absolute position of the requesting node from the authentication server to the authenticated node;
   calculating, by the authenticated node, the absolute position of the requesting node using received corresponding distance information from one or more other authenticated nodes;
   communicating the absolute position from the authenticated node to the authentication server; and
   allowing network access, by the authentication server, for the requesting node when the absolute position is within the network access boundary.

15. The method as claimed in claim 14, further comprising prior to the calculating of the absolute position:
   requesting, by the authenticated node, the corresponding distance information from the one or more other authenticated nodes; and
   receiving, by the authenticated node, the corresponding distance information from the one or more other authenticated nodes.

16. A wireless communication network configured to provide restricted network access to one or more nodes, the wireless communication network comprising:
   at least one requesting node operating to transmit a request for network access;
   at least one authenticated node communicating within the wireless communication network; and
   an authentication server, operating to:
      receive the request for network access from the requesting node via at least one authenticated node;
      receive a distance information between the requesting node and the authenticated node from the authenticated node;
      calculate a position of the requesting node using the received distance information; and
      allow network access, by the authentication server, for the requesting node when the calculated position is within a network access boundary.

* * * * *

UNITED STATES PATENT AND TRADEMARK OFFICE
CERTIFICATE OF CORRECTION

PATENT NO. : 8,325,653 B2  
APPLICATION NO. : 11/343550  
DATED : December 4, 2012  
INVENTOR(S) : Whitehill et al.

Page 1 of 1

It is certified that error appears in the above-identified patent and that said Letters Patent is hereby corrected as shown below:

On the Title Page

On Page 3, item (56), under "OTHER PUBLICATIONS", in Column 1, Line 5, delete "Normal" and insert -- Journal --, therefor.

On Page 3, item (56), under "OTHER PUBLICATIONS", in Column 1, Line 8, delete "LANs." and insert -- LANs, --, therefor.

On Page 3, item (56), under "OTHER PUBLICATIONS", in Column 2, Line 1, delete "Systems." and insert -- Systems, --, therefor.

On Page 3, item (56), under "OTHER PUBLICATIONS", in Column 2, Line 13, delete "Action." and insert -- Action, --, therefor.

On Page 3, item (56), under "OTHER PUBLICATIONS", in Column 2, Lines 22-23, delete "Positioning." and insert -- Positioning --, therefor.

Signed and Sealed this  
Thirtieth Day of April, 2013

Teresa Stanek Rea  
*Acting Director of the United States Patent and Trademark Office*